Figure 1:
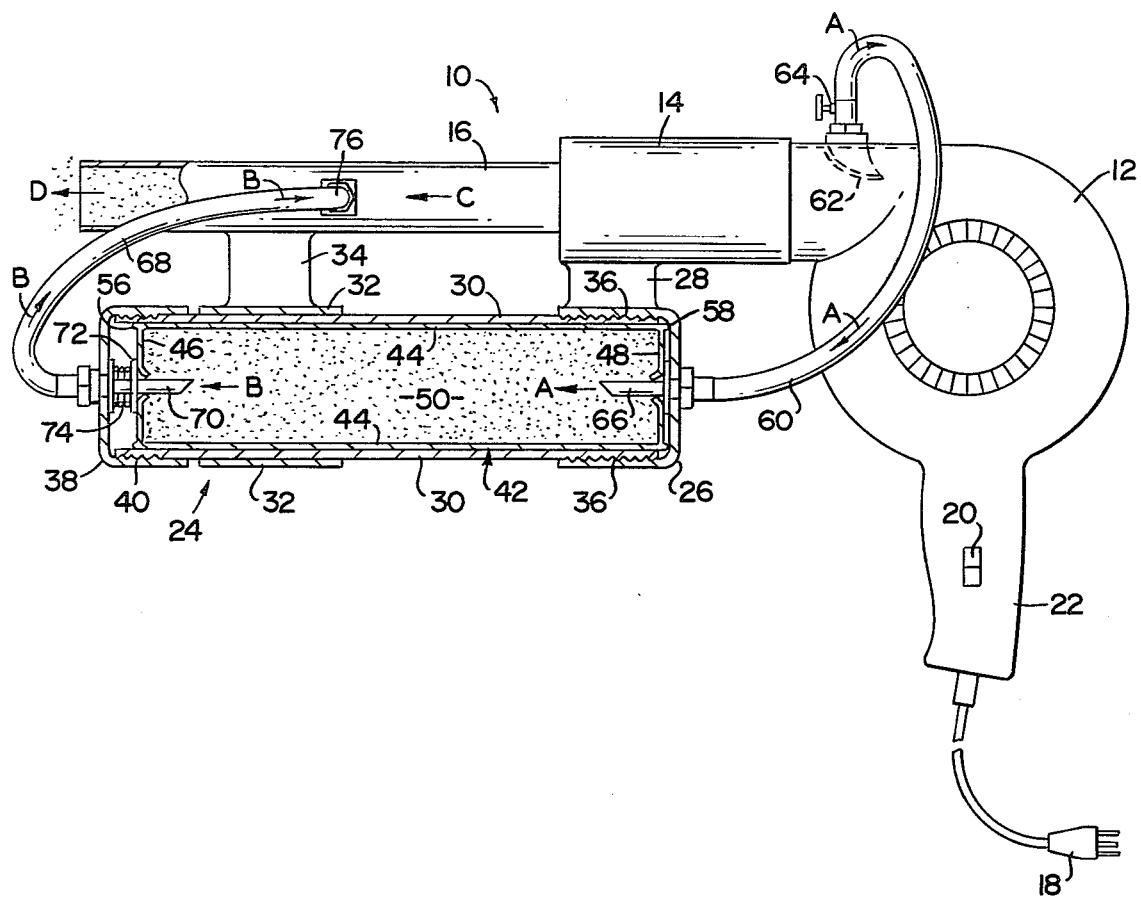
Figure 2:
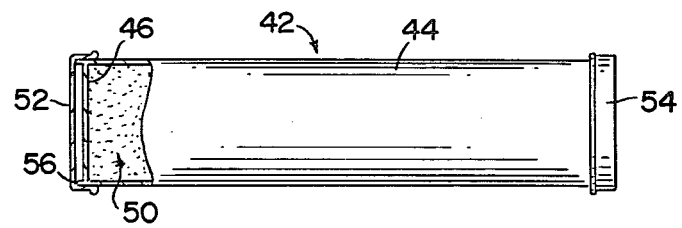

United States Patent [19]

Mesic

[11] 4,256,241
[45] Mar. 17, 1981

[54] PESTICIDE DUSTER

[76] Inventor: Robert S. Mesic, P.O. Box 95, Christmas, Fla.

[21] Appl. No.: 8,535

[22] Filed: Feb. 1, 1979

[51] Int. Cl.³ ............................................. B67B 7/24
[52] U.S. Cl. .................................... 222/85; 222/325; 222/630; 239/309
[58] Field of Search ............... 222/325, 630, 631, 632, 222/633, 637, 81, 82, 83, 83.5, 85, 86, 88; 239/654, 309, 365, 366, 317; 206/384

[56] References Cited
U.S. PATENT DOCUMENTS

| 1,406,903 | 2/1922 | Rose | 222/325 X |
| 1,406,904 | 2/1922 | Rose | 222/86 X |
| 1,838,648 | 12/1931 | Atwood | 222/630 |
| 2,027,408 | 2/1936 | Bramsen et al. | 239/654 |
| 2,111,582 | 3/1938 | Crewe | 206/384 X |
| 2,934,241 | 4/1960 | Akesson | 222/630 X |
| 3,159,311 | 12/1964 | Fowler | 222/82 |

FOREIGN PATENT DOCUMENTS 616328  1/1927  France .................................... 222/88

Primary Examiner—Allen N. Knowles
Attorney, Agent, or Firm—Duckworth, Hobby, Allen & Pettis

[57] ABSTRACT

A fluid-solid mixing and dispensing apparatus primarily intended for use in the application of pesticide dust. The apparatus comprises a blower and a removable, disposable pesticide dust cartridge attachable to the blower in fluid-communicating relation to at least a portion of the blower's fluid flow stream. A volume control is provided so as to regulate the quantity of fluid flowing through the cartridge, thereby regulating the quantity of pesticide dust actually dispensed.

8 Claims, 2 Drawing Figures

U.S. Patent  Mar. 17, 1981  4,256,241

PESTICIDE DUSTER

BACKGROUND OF THE INVENTION

1. Field of the Invention

The present invention relates to an apparatus for mixing solid particulate matter into a fluid flow and for dispensing the fluid-solid mixture therefrom. The apparatus is primarily intended for use in the application of pesticides by dusting.

2. Description of the Prior Art

Quite frequently, it is desirable to apply a substantially uniform coat of a powder-like material to an object. For example, in various manufacturing operations it is often desirable to apply a powdered resin coating to an article or a particular section of an article for subsequent curing so as to form a coating thereon. Yet other examples calling for the application of powdered dry material are readily observable in plant-related industries. It is for example, well known to apply pesticides, fungicides, fertilizers, and similar such materials to plants in both agricultural and ornamental environments. In recognition of these needs, numerous prior art devices have been developed and are known in the prior art for mixing a solid particulate matter with a fluid flow stream for ultimately dispensing the solid material onto a predetermined object or surface.

Perhaps one of the earliest teachings in the prior art is given by U.S. Pat. No. 56,558. That patent to Hendley teaches the use of a bellows having a sand reservoir disposed so as to dispense sand into the fluid flow stream exhaust from the bellows.

U.S. Pat. No. 2,126,924 to Rose discloses a spraying device particularly intended for use in powder-spraying foilage. The Rose device is, in construction and operation, virtually identical to a pump-type spraying for the mixing and dispensing of liquids. The liquid concentrate reservoir is, in Rose, replaced by a dust reservoir. However, it should be noted that the dust is injected into the fluid flow stream outside the device. This may result in uneven application of the powder. Furthermore, since the powder exit is outside the device, the exit's orifice is subjected to atmospheric conditions and may become blocked. This also provides a substantially unobstructed passageway for the admission of moisture into the powder reservoir.

Yet another dusting device is shown in U.S. Pat. No. Des. 180,095. Finally, a blower-operated powder dispenser is taught by U.S. Pat. No. 3,854,634 to Hart. That patent teaches a construction whereby the entire fluid flow from a blower is admitted into a powder reservoir. The reservoir contains a diffuser plate placed within the reservoir upstream of the powder. As the fluid flow passes around the diffuser plate particulate matter is mixed into the flow stream. Finally, an exit is provided for the ultimate dispensing of the fluid including the particulate matter dispersed therein.

While other examples of such powder dispensers are known in the prior art, it should also be noted that prior art teachings concerning fluid-fluid mixing and dispensing as well as fluid-gas mixing and dispensing apparatus may also be considered as pertinent to the subject matter of this invention. For example, U.S. Pat. No. 4,039,105 to Chan discloses a liquid-liquid mixing and dispensing device for the application of liquid fertilizer in combination with water delivered by an ordinary garden hose.

In light of these prior art teachings, and with particular regard to those devices concerning powder dispensing and dusting, certain unsolved problems are apparent. First, virtually all the prior art devices include a fixed reservoir for the powder material. In order to change the material being applied it is necessary to physically empty the reservoir. In some instances, depending upon the compatibility of the powder materials being utilized, extensive cleaning might also be required. Additionally, certain ones of the prior art devices are constructed so as to provide virtually unobstructed access from the powder to the atmosphere. Not only might this be dangerous, but also it will necessarily tend to enhance any hydroscopic characteristics of the material, resulting in caking of the material and, ultimately, unoperability of the device.

It is therefore apparent that there is a great need in the art for a fluid-solid mixing and dispensing apparatus including the means for easily and rapidly changing, or replacing, the solid material being mixed and dispensed therefrom. Of course, the container for the powdered material should, insofar is practical, be protected from the atmosphere so as to inhibit its absorption of moisture as well as to prevent the accidental discharge of powder from the device. As with any article of manufacture, the apparatus satisfying these needs should be of relatively simple construction and operation. On many occasions the solid material being mixed and dispensed will have corrosive tendencies. Accordingly, such an apparatus should be constructed so as to prevent the entry of particulate matter into the blower section of the device.

SUMMARY OF THE INVENTION

The present invention relates to a fluid-solid mixing and dispensing apparatus of the type primarily intended for use in applying pesticides by dusting. More particularly, then, the preferred embodiment of this invention is utilized for the addition of a powdered, dry solid material to an air stream so that the solid material may be dispensed onto a predetermined surface or object, such as a plant. While the apparatus of this invention will be described with particular regard to this preferred embodiment hereinafter, the scope of the invention is not to be limited thereto. It is contemplated that the apparatus of this invention may also be utilized for liquid-solid mixing and dispensing such as, for example, the addition of powdered material to a stream of water.

The mixing and dispensing apparatus comprises a fluid blower means which provides the primary fluid flow for operation of the device. In the preferred embodiment the fluid blower means comprises an electrical air blower.

A cartridge receiver means is formed on the blower in at least partial fluid-communicating relation thereto. That is to say, at least a portion of the fluid flow generated by the blower will be directed through the cartridge receiver and then returned to the main fluid flow in the vicinity of its exhaust from the blower. Finally, a cartridge means is provided and is operatively installed within the cartridge receiver means. Placed within the cartridge is the solid particulate material intended to be mixed and dispensed.

The cartridge means of this invention is particularly designed and constructed for simple placement into and removal from the cartridge receiver means. Accordingly, it is a relatively simple operation to change from one solid material to another, or to replace an empty cartridge. While a more detailed description of a preferred embodiment for the cartridge will be presented hereinafter, it should be noted that the cartridge is constructed so as to protect the solid material placed therein from deleterious atmospheric conditions and is intended to be disposable.

Partial fluid flow through the container so as to mix and dispense the solid material placed therein is accomplished by fluid pickup means and removable closure means comprising a fluid-solid delivery conduit. The fluid pickup means is disposed in fluid-communicating relation between the other end of the cartridge and point on the blower means downstream of the pickup conduit. Furthermore, a volume control means is operatively disposed within the pickup conduit so as to regulate the portion of fluid flow passing therethrough. Regulating this fluid flow will, in effect, control the quantity of solid material actually dispensed by the apparatus.

Attachment of the cartridge means in fluid-communicating relation to the apparatus is accomplished by piercing opposite frangible end portions of the conduit. For the purpose of protecting these frangible end portions during times of storage, the cartridge means further comprises removable protector caps, one cap being disposed in closing relation around each end of the cartridge. It should be obvious that these protector caps must be removed before the cartridge is operatively installed within the receiver means of the apparatus. It is also to be understood that should a cartridge be removed before it has been emptied, the protector caps may be replaced on the cartridge end for storage and subsequent use of that particular cartridge.

The invention accordingly comprises features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is an elevational view of the invention, partially in section to illustrate interior detail.

FIG. 2 is a plan of the cartridge means, with a section of one end broken away to show interior detail.

Similar reference characters refer to similar parts throughout the several views of the drawings.

DETAILED DESCRIPTION

The fluid-solid mixing and dispensing apparatus of this invention is generally indicated as 10 in the view of FIG. 1. Apparatus 10 comprises a blower means including a blower housing 12, a fluid exhaust throat 14, and a throat extension 16. As shown in the preferred embodiment of FIG. 1, the blower means is electrically operated as by connecting plug 18 to a suitable source of electrical energy. Operation of the blower means is regulated by switch 20 operatively disposed on handle 22 attached to housing 12.

A cartridge receiver means generally indicated as 24 is attached to the blower means, and, as is more fully set forth below, is in fluid-communicating relation to at least a portion of the fluid delivered by the blower means. Cartridge receiver means 24 comprises a first end portion 26 fixedly attached to exhaust throat 14 as by first leg 28. Body 30 of the receiver means 24 is attached to first end portion 26 by first inserting body 30 through loop support 32 which is attached to throat extension 16 as by second leg 34. Then, body 32 is attached to first end portion 26 as by threads 36. The other end of body 30 is then sealed by placing closure means 38 thereon. Closure means 38 is removably attached to body 30 as by threads 40.

At this point it is to be noted that body 30 and first end portion 26 may define a unitary construction and may be integrally attached to exhaust throat 14 and throat extension 16. That is to say, in order to fall within the scope of this invention it is not necessary that body 30 be removably attachable to first end portion 26. However, as will be set forth below in greater detail, it is contemplated that removable closure means 38 is necessary insofar as access to the interior of body 30 is necessary.

Attention is now invited to the detailed view of FIG. 2 wherein a preferred construction for the cartridge means, generally indicated as 42, is shown. In this preferred embodiment cartridge means 42 comprises a substantially cylindrical configuration including a cartridge body 44 and oppositely disposed end portions 46 and 48. End portion 48 cannot be seen in the view of FIG. 2, but is shown in the view of FIG. 1. Placed within cartridge means 42 is the solid, powdered material to be dispensed by apparatus 10. In this preferred embodiment solid material 50 consists essentially of a powdered pesticide. End portions 46 and 48 are formed from a frangible material for reasons more fully set forth below. Accordingly, it is desirable to provide removable protector caps 52 and 54 in order to protect frangible end portions 46 and 48 when the cartridge means is not operatively installed within cartridge receiver means 24. Protective caps 52 and 54 are, of course, to be removed prior to operatively installing cartridge means 42. With particular attention to the fragmentary section of FIG. 2, yet another structural feature of the preferred embodiment for cartridge means 42 may be seen. An axially extending annular lip 56 is formed on cartridge body 44 around the perimeter of end portion 46. The view of FIG. 1 shows a corresponding lip 58 around the perimeter of end portion 48. It should be obvious that each end of cartridge means 42 is similarly configured so as to allow for insertion of cartridge means 42 into cartridge receiver means 24 without regard to the orientation of end portions 46 and 48.

Now attention is again invited to the view of FIG. 1. As shown in FIG. 1 the protective caps 52 and 54 have been removed from the cartridge means 42, and it, in turn, is operatively disposed within receiver means 24. Attention is now invited to a consideration of fluid flow through apparatus 10 so as to mix and dispense solid material 50 therefrom.

First end portion 26 of receiver means 24 further comprises a fluid pickup means including a pickup conduit 60. One end of pickup conduit 60 comprises a pickup chute 62 disposed in fluid-receiving relation to at least a portion of the fluid driven from blower housing 12 into exhaust throat 14. The path of travel of this portion of the fluid is indicated by directional arrows A. The volume of fluid traveling path A may be regulated by a volume control means 64 operatively disposed on pickup conduit 60 between pickup chute and first end portion 26.

The other end of pickup conduit 60 comprises a first piercing member 66 which pierces end portion 48 so as to admit fluid flow into cartridge means 42.

As the fluid flow passes through cartridge means 42 it agitates solid material 50 so that a mixture of solid material 50 and fluid exits as indicated by directional arrows B. It can be seen that this exit fluid-solid flow B is received and directed by closure means 38, and, further, that closure means 38 also comprises a fluid-solid delivery conduit 68. One end of delivery conduit 68 comprises a second piercing member 70 which fractures end portion 46 so as to admit that fluid-solid mixture thereinto. It should also be noted that a sealing means comprising a sealing washer 72 and a biasing means 74 is movably disposed around second piercing member 70 so as to provide a substantially fluid-tight seal between end portion 46 and the second piercing member 70. The other end 76 of delivery conduit 68 is disposed in fluid-communicating relation to the main fluid flow, as indicated by directional arrow C by its attachment through throat extension 16 at a point downstream of pickup chute 62.

The fluid-solid mixture then disperses within throat extension 16 into the main fluid flow to yield the desired fluid exhaust as indicated by directional arrow D.

Having thus set forth a preferred embodiment for the construction of apparatus 10, attention is now invited to a brief consideration of the operation of this preferred embodiment including the steps necessary to operatively install a cartridge means 42 within its receiver means 24. First, closure means 38 is removed by unscrewing threads 40 or other appropriate fastening means. Next, protective caps 52 and 54 are removed from the cartridge means 42 containing the material 50 intended to be mixed and dispensed. Cartridge means 42 is then inserted into body 30 of cartridge receiver means 24. As closure means 38 is replaced onto receiver body 30 and threads 40 are tightened and drawn toward piercing member 66, first piercing member 66 and second piercing member 70 will fracture end portions 46 and 48, respectively. When closure means 38 is fully threaded onto body 30 lip 58 will abuttingly engage the interior of the first end portion 26 so as to provide a substantially fluid-seal at that end, and sealing washer 72 will abuttingly engage frangible end portion 46 by virtue of the force of biasing means 74 so as to provide a substantially fluid-tight seal at that end. Actuating apparatus 10 by turning switch 20 will result in at least a portion of the fluid flow from the blower means, as determined by the adjustment of volume control means 64, to enter cartridge means 42. As the fluid passes through cartridge means 42 a fluid-solid mixture will be generated and will exit the cartridge receiver means 24 as indicated by directional arrows B. At end 76 of the delivery conduit 68 this fluid-solid mixture is added to the main fluid flow indicated by directional arrow C, and the resulting mixture is exhausted as indicated by arrow D.

All that is necessary to remove or to replace cartridge means 42 is to first secure switch 20, then remove closure means 38 and withdraw cartridge means 42. If cartridge means 42 is empty, it should be properly disposed of. If, however, a useful quantity of solid material 50 remains within cartridge means 42, this may be retained for future use by simply replacing protective caps 52 and 54 over fractured end portions 46 and 48, respectively.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fluid-solid mixing and dispensing apparatus of the type primarily intended for use in applying pesticides by dusting, said apparatus comprising, in combination:

fluid blower means whereby a main flow of fluid is provided;

cartridge receiver means formed on said blower means in fluid-communicating relation to a portion of the fluid delivered by said blower means, said cartridge receiver means comprising a cartridge holder fixedly attached to said blower means, one end of said holder comprising fluid pickup means comprising a pickup conduit, one end of said pickup conduit comprising a pickup chute disposed in fluid-receiving relation to said portion of said fluid, and adjustable volume control means operatively disposed in said pickup conduit downstream of said pickup chute whereby the volume of said portion of said fluid may be adjusted within predetermined parameters; the other end of said holder including a delivery conduit delivering to the main flow of fluid and cartridge means removably attachable to said receiver means, said cartridge means comprising a solid material placed therein, whereby said portion of said fluid will pass through said cartridge means so as to mix and dispense said solid material with the main flow of the fluid exhaust from said blower means.

2. A fluid-solid mixing and dispensing apparatus as in claim 1 wherein the other end of said pickup conduit comprises a first piercing member for delivering said portion of said fluid to said cartridge means attached thereto.

3. A fluid-solid mixing and dispensing apparatus as in claim 1 wherein the other end of said holder comprises removable closure means disposed in interconnecting, fluid-communicating relation between said cartridge means placed within said holder and said fluid exhaust.

4. A fluid-solid mixing and dispensing apparatus as in claim 1 wherein said closure means comprises a fluid-solid delivery conduit, one end of said delivery conduit comprising a second piercing member for receiving said portion of said fluid including said solid material mixed thereinto, and the other end of said delivery conduit being disposed in fluid-communicating relation to said main flow downstream of said fluid pickup means, whereby said solid material is dispensed in said fluid exhaust from said blower means.

5. A fluid-solid mixing and dispensing apparatus as in claim 4 wherein said one end of said delivery conduit further comprises sealing means movably disposed around said second piercing member to abuttingly engage said cartridge means operatively disposed within said cartridge holder.

6. A fluid-solid mixing and dispensing apparatus as in claim 1 wherein said cartridge means further comprises oppositely disposed end portions, each of said end portions being formed of a frangible material.

7. A fluid-solid mixing and dispensing apparatus as in claim 6 wherein said cartridge means further comprises a pair of removable protector caps, one of said caps being disposed on each of said end portions to protect said frangible material, said protector caps being removed prior to operatively attaching said cartridge means to said receiver means.

8. A fluid-solid mixing and dispensing apparatus as in claim 6 wherein said cartridge means further comprises an axially extending annular lip formed around the perimeter of each of said end portions.

* * * * *

UNITED STATES PATENT AND TRADEMARK OFFICE
CERTIFICATE OF CORRECTION

PATENT NO. : 4,256,241
DATED : March 17, 1981
INVENTOR(S) : Robert S. Mesic

It is certified that error appears in the above—identified patent and that said Letters Patent are hereby corrected as shown below:

Claim 4, column 6, line 52, delete "1" and insert therefor-- 3--.

Signed and Sealed this

*Twenty-sixth* Day of *May 1981*

[SEAL]

*Attest:*

RENE D. TEGTMEYER

*Attesting Officer*     *Acting Commissioner of Patents and Trademarks*